I. P. FARRINGTON.
INSECT DESTROYER.
APPLICATION FILED APR. 6, 1910.
962,561.
Patented June 28, 1910.
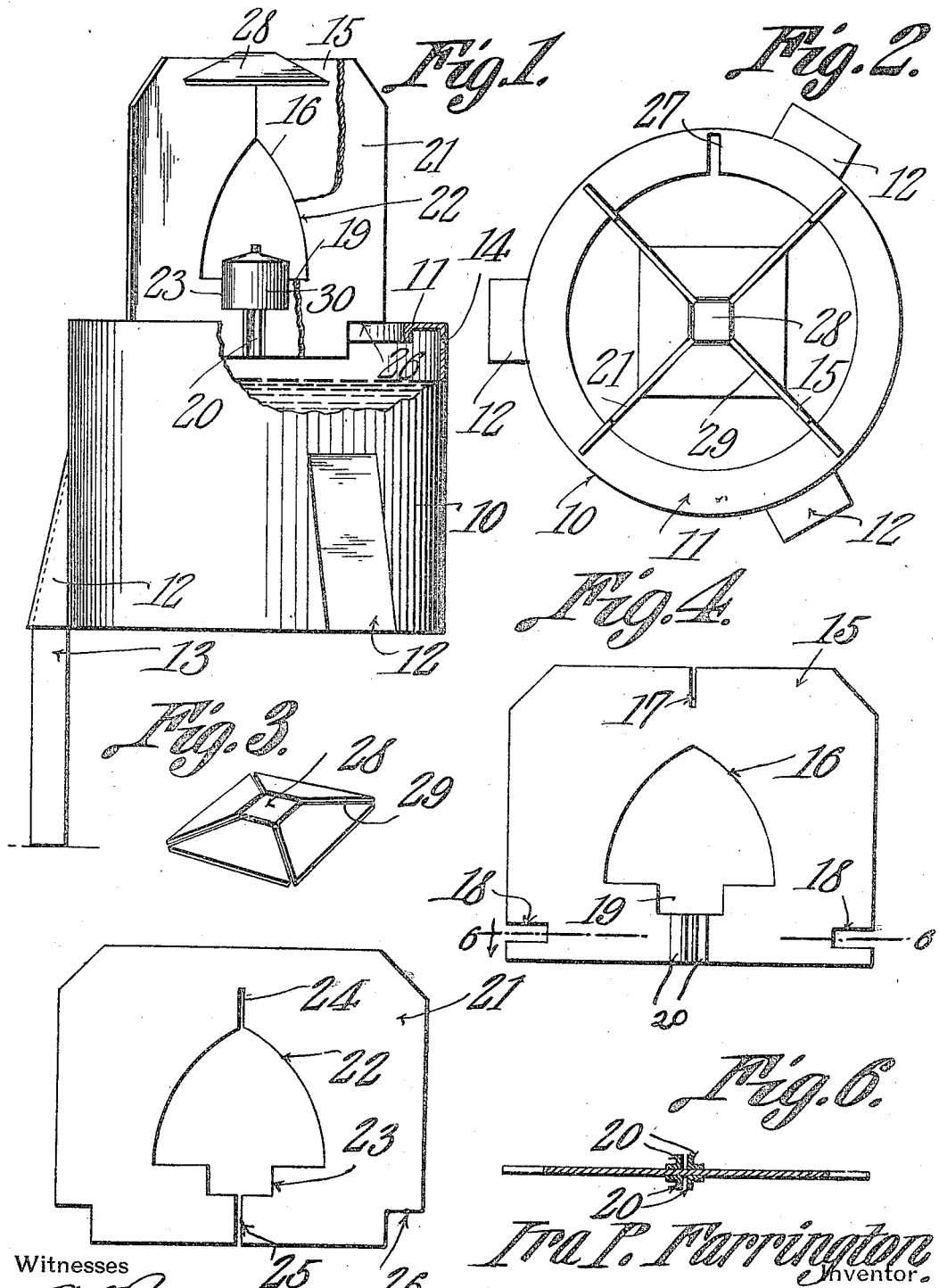

UNITED STATES PATENT OFFICE.

IRA P. FARRINGTON, OF TRINIDAD, COLORADO.

INSECT-DESTROYER.

962,561.  Specification of Letters Patent.  Patented June 28, 1910.

Application filed April 6, 1910.  Serial No. 553,692.

*To all whom it may concern:*

Be it known that I, IRA P. FARRINGTON, a citizen of the United States, residing at Trinidad, in the county of Las Animas and State of Colorado, have invented a new and useful Insect-Destroyer, of which the following is a specification.

It is the object of the present invention to provide an improved construction of insect destroyer and the invention relates more particularly to that class of insect destroyers which are so arranged and constructed as to attract insects to the immediate vicinity thereof and lure them to the destroying means or medium.

One of the primary aims of the invention is to so construct the device that it may be readily set up for use and readily taken apart when it is desired to clean the same or remove therefrom the insects which have been destroyed thereby.

The device embodies a receptacle above which are arranged radial wings preferably of highly polished sheet metal, and the invention contemplates that these wings shall support, directly above the center of the receptacle, a torch or lamp, the rays of light from which attract the insects and cause them to dash themselves against the wings after which they fall into water or other liquid contained in the vessel, and the said wings are so assembled that this portion of the device may be readily taken apart and the wings laid flat upon a table or other surface when it is desired to clean or repolish them.

In the accompanying drawings,—Figure 1 is a side elevation partly in section of an insect destroyer embodying the present invention. Fig. 2 is a top plan view thereof. Fig. 3 is a perspective view of a cap member for holding the wings in proper assembled relation. Fig. 4 is a view in elevation of one of the wings. Fig. 5 is a similar view of the other wing, and Fig. 6 is a horizontal sectional view of the line 6—6 of Fig. 4.

In the drawings, the device is illustrated as embodying a water container or vessel which while it is here illustrated as cylindrical, may take some other form if found desirable. This container is indicated by the numeral 10 and at its upper edge is provided with an inwardly projecting flange 11. The container 10 is provided with suitable sockets 12 receiving the upper ends of supporting legs or standards 13. The container 10 is furthermore provided at diametrically opposite points of the openings 14 in which may be engaged the extremities of a unit bail (not shown) the said bail being utilized as a handle whereby the device may be carried from place to place.

As heretofore stated, wings are supported above the container 10 and these wings are embodied in interlocked plates, one of which is illustrated in Fig. 4 of the drawings and the other in Fig. 5. The plate in Fig. 4 of the drawings is indicated by the numeral 15 and is formed at its middle with a semi-elliptical opening 16 and directly above this opening with a notch 17 opening through the upper edge of the plate. In its vertical edges, the plate 15 is formed with notches 18 correspondingly located near the lower edge of the plate. The opening 16 has a downward extension 19 and secured upon each side face of the plate 15 and extending between the lower edge of this extension 19 of the opening and the lower edge of the plate are spaced angle strips 20. The other plate is indicated by the numeral 21 and is formed with an opening 22 corresponding to the opening 16 both in outline and in location and having an extension 23 corresponding to the extension 19. The plate 21 is formed also with a notch 24 which corresponds to the notch 17 except that instead of opening through the upper edge of the plate, it opens through the upper edge of the opening 22 therein. A slot 25 is formed in the plate 21 and extends from the lower edge of the extension 23 of the opening 22 to the lower edge of the plate and each lower corner of the plate is cut-away, as at 26.

In assembling the plates with the receptacle, the plate 15 is so disposed as to bring one of its notches into engagement with the flange 11 and the other side of the plate is then lowered through a notch 27 formed in the said flange 11 until the flange engages with the other notch 18, whereupon the plate is so moved around its vertical medial line as an axis so as to clear the notch 27. Then, the plate 21 is slipped down over the plate 15 in a plane at right angles to the plane of the said plate 15 until its notch 24 engages and interlocks with the notch 17 and the edges of its slot 25 fit between the spaced angle strips 20 and the said plate 15. At such time, the cut-away corners 26 of the plate 21 will engage with the flange 11 and the two plates will thus be supported in planes at right angles and resting at their lower corners upon the said flange 11 of the container 10. In order that the plates may be held fixedly in planes at right angles with respect to each other, there is provided a cap member which is clearly shown in Fig. 3 of the drawings and is in the form of a bulged rectangular plate 28 which is formed with slots 29 extending inwardly from each corner toward the center thereof and this plate is so disposed that its said slots will engage with the upper edge portions of the four radial wings afforded by the plates 15 and 21. It will be understood, of course, that the lower portion of the plates are held in proper relative position by reason of the engagement of the edges of the slots 25 of the plate 21 between the spaced angle strip 20 of the plate 15. After the parts have been assembled in the manner stated, the body 30 of a torch is disposed within the extension 19 and 23 of the openings 16 and 22 respectively and is confined between the vertical edges of the said extensions and when the device is in actual use, the container is partly filled with water and a suitable quantity of coal oil is then poured upon the surface of the water and the torch 30 is lighted and the rays of light given therefrom will attract to the immediate vicinity of the device the insects to be destroyed which insects will, in approaching the light, dash themselves against the surface of the wings embodied in the plates 15 and 21 and will drop into the fluid in the receptacle. Should the insects thus trapped not be drowned and should they manage in some way to escape from the container, the coal oil with which they become saturated will in a short time result in their death. The torch 30 is firmly supported in position above the water and oil in the container 10 by the wings 15 and 21, as will be readily understood, and it will further be observed that the cap member serves not only as a means for relatively bracing the said wings but also as a smoke bell for the torch 30.

What is claimed is:

1. In a device of the class described, a container having a flange, a plate having notches engaging with the flange and formed in its upper edge with a notch and provided upon its opposite faces at its lower portion with spaced strips, a plate fitted upon the first mentioned plate and having a notch interlocking with the notch in the upper edge thereof and slotted and having the edges of its slots fitting between the spaced strips of the first mentioned plate, the said plates being thus held in intersecting planes, the plates being formed at their points of intersection each with an opening, and an illuminating device supported upon the lower edges of the openings in said plates.

2. In a device of the class described, a container having a flange, a plate having notches engaging with the flange and formed in its upper edge with a notch and provided upon its opposite faces at its lower portion with spaced strips, a plate fitted upon the first mentioned plate and having a notch interlocking with the notch in the upper edge thereof and slotted and having the edges of its slot fitting between the spaced strips of the first mentioned plate, the said plates being thus held in intersecting planes, the plates being formed at their points of intersection each with an opening, and an illuminating device supported upon the lower edges of the openings in said plates, and a cap member slotted to engage with the upper edges of the plates and hold the same properly relatively positioned.

In testimony that I claim the foregoing as my own, I have hereto affixed my signature in the presence of two witnesses.

IRA P. FARRINGTON.

Witnesses:
E. E. LEARNED,
ELI JEFFRYS.